(12) United States Patent
Sosnovsky et al.

(10) Patent No.: US 9,767,313 B2
(45) Date of Patent: Sep. 19, 2017

(54) METHOD FOR AUTOMATED SEPARATION AND PARTITIONING OF DATA IN A PAYROLL AND RESOURCE PLANNING SYSTEM

(71) Applicant: Limited Liability Company "1C", Moscow (RU)

(72) Inventors: Victor Grigorievich Sosnovsky, Moscow (RU); Oday Halikovich Derut, Moscow (RU); Sergey Georgievich Nuraliev, Moscow (RU)

(73) Assignee: LIMITED LIABILITY COMPANY "1C", Moscow (RU)

( * ) Notice: Subject to any disclaimer, the term of this patent is extended or adjusted under 35 U.S.C. 154(b) by 357 days.

(21) Appl. No.: 14/603,541

(22) Filed: Jan. 23, 2015

(65) Prior Publication Data
US 2016/0217299 A1     Jul. 28, 2016

(51) Int. Cl.
| G06F 17/30 | (2006.01) |
| G06F 21/62 | (2013.01) |
| G06F 9/30  | (2006.01) |
| H04L 29/08 | (2006.01) |
| G06Q 10/00 | (2012.01) |

(52) U.S. Cl.
CPC ...... *G06F 21/6227* (2013.01); *G06F 9/30189* (2013.01); *G06F 17/30424* (2013.01); *G06F 17/30486* (2013.01); *G06Q 10/00* (2013.01); *H04L 67/141* (2013.01)

(58) Field of Classification Search
None
See application file for complete search history.

(56) References Cited

U.S. PATENT DOCUMENTS

| 9,052,831 | B1 * | 6/2015 | Stefani | G06F 3/0644 |
| 2002/0165727 | A1 * | 11/2002 | Greene | G06Q 10/06311 |
| | | | | 705/1.1 |
| 2011/0083167 | A1 * | 4/2011 | Carpenter | G06F 17/30563 |
| | | | | 726/4 |
| 2012/0166401 | A1 * | 6/2012 | Li | G06F 17/3033 |
| | | | | 707/692 |
| 2012/0310959 | A1 * | 12/2012 | Huhn | G06F 17/30339 |
| | | | | 707/756 |

(Continued)

OTHER PUBLICATIONS

Schwabe et al, "A Separator-Based Framework for Automated Partitioning and Mappings of Parallel Algorithms for Numerical Solution of PDEs", 2005.*

(Continued)

*Primary Examiner* — Hung Le
(74) *Attorney, Agent, or Firm* — Bardmesser Law Group

(57) ABSTRACT

A system for separation of data is provided. The data separation is implemented using a special data structure—a common attribute. The common attribute is a metadata object, which allows for using the same requisite for many configuration objects (directories, documents, charts of accounts, constants, etc.). A configuration developer can add and configure the common attributes in order not to change the standard objects and configurations. In other words, the developer does not need to add divider-columns into each table or other object. Instead, the developer can set a common attribute for some of the objects and control only this requisite.

12 Claims, 7 Drawing Sheets

(56) References Cited

U.S. PATENT DOCUMENTS

| | | | | |
|---|---|---|---|---|
| 2013/0080477 | A1* | 3/2013 | Evans | G06F 17/30961 |
| | | | | 707/802 |
| 2013/0219465 | A1* | 8/2013 | Tse | H04L 63/10 |
| | | | | 726/3 |
| 2014/0067810 | A1* | 3/2014 | Wisnovsky | G06F 17/30705 |
| | | | | 707/737 |
| 2014/0359680 | A1* | 12/2014 | Shivadas | H04N 21/8455 |
| | | | | 725/90 |
| 2015/0032694 | A1* | 1/2015 | Rajamani | G06F 17/30368 |
| | | | | 707/625 |
| 2015/0310051 | A1* | 10/2015 | An | G06F 17/30864 |
| | | | | 707/738 |
| 2015/0381590 | A1* | 12/2015 | Bosko | H04L 63/0428 |
| | | | | 713/171 |
| 2016/0103717 | A1* | 4/2016 | Dettori | G06F 9/45558 |
| | | | | 719/318 |
| 2016/0156631 | A1* | 6/2016 | Viswanathan | H04L 67/06 |
| | | | | 726/3 |

OTHER PUBLICATIONS

Wachs et al, "Partitioning the Internet", 2012.*

* cited by examiner

METHOD FOR AUTOMATED SEPARATION AND PARTITIONING OF DATA IN A PAYROLL AND RESOURCE PLANNING SYSTEM

BACKGROUND OF THE INVENTION

Field of the Invention

The present invention is related to methods for data management and, in particular, to automated separation of data.

Description of the Related Art

Typically, user data is stored in a structured format in a database. Modern databases need to provide for multi-tenancy—i.e., serving of users from different organizations in an isolated mode within the same service. For example, some users can see only the names and addresses of the clients, while other users (e.g., bank employees) can see client account data. In other words, different subscribers to data service are isolated from each other in terms of accessing the data from the same sources.

Conventionally, the multi-tenancy (isolation) can be provided by implementing a user table, where each user (subscriber) is assigned a unique primary key. Then, the primary key can be used as key for selecting corresponding records from other tables of a database. Each table has to have a "UserID" field and each user request selects data only available for the particular UserID. This conventional approach is efficient in terms of isolation of users. However, it is hard to change what data is allowed for a given UserID. In order to do this, the data field setting in each of the hundreds and even thousand of tables may have to be changed.

A method for data isolation is described in US patent publication 2013086322. Addition of tenant discrimination columns in various tables in order to isolate data is known. However, the problem becomes more complex if several columns (keys) are used for dividing data. The task is even more complex if a number of dividers changes with time. If a number and content of the dividers changes, the queries for modifying corresponding tables, fields and keys need to be re-written and executed. Alternatively, an executable code for generating the database queries has to be re-written. US Patent Publication No. 2013086322 discloses a special code with notations for separation of data. However, the described solution does not provide for turning data separation on and off. Additionally, it is desired to simplify the routine operations for data separation, so they can be implemented by a database administrator using a visual interface instead of the developers making changes to the source code.

Accordingly, there is a need in the art for a system and method for an automated control of data separation.

SUMMARY OF THE INVENTION

The present invention is related to methods for data management and, in particular, to an automated separation of data. The present invention provides a system for data separation that substantially obviates one or several of the disadvantages of the related art.

In one aspect of the invention a system for separation of data is provided. According to an exemplary embodiment, data separation is implemented using a special data structure—a common requisite attribute. The common attribute is a metadata object, which allows for using the same requisite for many configuration objects (directories, documents, charts of accounts, constants, etc.). A configuration developer can add and configure the common attributes in order not to change the standard objects and configurations. In other words, the developer does not need to add divider-columns into each table or other object. Instead, the developer can set a common attribute for some of the objects and control only this requisite.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
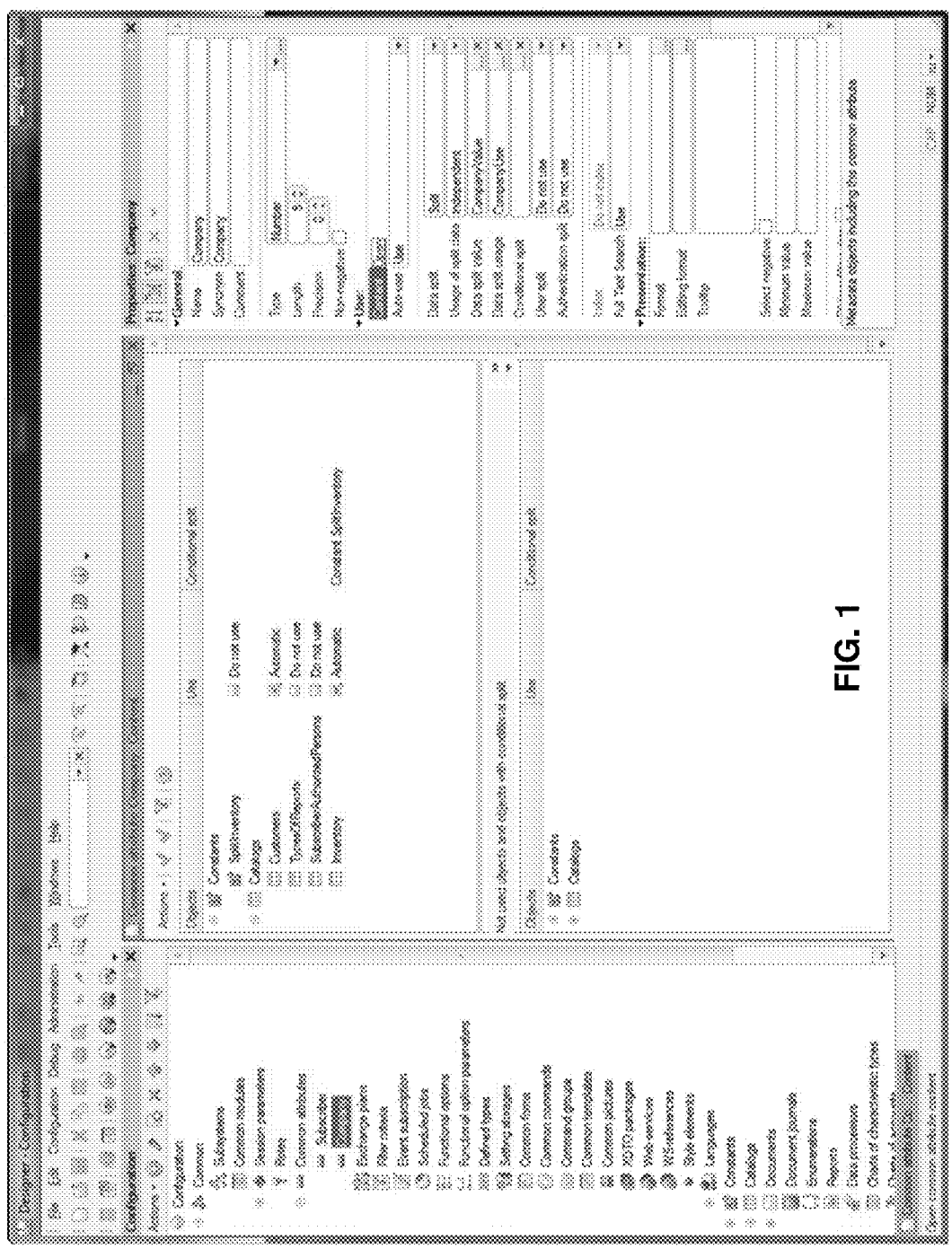
FIG. 1 illustrates that the separator includes directories, in accordance with the exemplary embodiment.

Reference will now be made in detail to the preferred embodiments of the present invention, examples of which are illustrated in the accompanying drawings.

According to an exemplary embodiment, a method and system for separation of data are provided. Configuration contains forms and data structures. The configuration can be used for accounting or other means. The configuration can contain settings such as a client name and the name of the organization. A platform is a set of specific objects for storing data reflecting constants, directories, documents, charts of accounts, etc. In other words, a "platform"—such as a RDBMS and execution environment for a "Configuration"—provides an subject-specific object model for data and metadata storing and manipulation, including (but not limited to) such objects types as constants, directories/catalogs/folders, documents, document's journals, charts of accounts, as well as common requisites/attributes. "Configuration" (also known as "Applied solution")—is a set of named objects and metadata defining data structures, GUI and information processing algorithms of the particular business application.

According to the exemplary embodiment, the data separation is implemented using a special data structure—a common attribute. The common attribute is a metadata object, which allows for using the same requisite for many configuration objects (directories/catalogs, documents, charts of accounts, constants, etc.). An application developer can add and configure the common attributes in order not to change the standard objects and configuration code. In other words, the developer does not need to add divider-columns into each table or other object. Instead, the developer can set a common attribute for some of the objects and control only this requisite.

The common attribute object has some pre-defined properties, such as name, content, value and usage of the data being separated. The difference between the common attribute and the primary key of the database tables is in a paradigm of working with the common attribute. The administrator creates a new common attribute object and defines its content using a visual interface. The administrator launches some low level background processes for modification and addition of key and separator fields in various tables. The background processes also automatically generate queries for retrieving data from the isolated and the common areas of the database.

According to the exemplary embodiment, a constant is a metadata object, which stores rarely modified data. This data can be implemented as a table or an array with a defined number of elements. Session parameters are common configuration objects. The parameter value is set and kept unchanged during a session. The session parameters can be used, for example, for limiting access to the data at records level.

According to the exemplary embodiment, the data separation mechanism allows for applications to work within a multi-tenancy architecture implemented on a cloud. The application is used in a client-server mode, thus the separated data is stored on a server side. The client can access only his data since the common application object on the server (e.g., a directory) serves multiple clients. If a common attribute has a data separation property set as "separate", the data separation mode is activated. The behavior of configuration objects included into a common attribute (or into a separator) changes accordingly. For each of the separators in the database, a current value of the separator and a condition for using a given separator are defined.

The separator object can include configuration objects such as constants, directories, documents, sequences, document logs, charts of accounts, etc. If the common attribute has a parameter "usage of separated data" set as an independent for a given session, then any access to the separated data is not allowed if the separator is not used in the given session. The separator is not available in an object model, in a query language, in loading XML and XDTO formats. When the separated data is written, the system automatically fills the common attribute with the values set in a current session. This mode of operation can be used when an application uses data from only one data area.

If the common attribute has a parameter "usage of separated data" set as commonly-independent for a given session, the access to separated objects is allowed regardless of use of the separator within the session. The areas of data defined by the separator values are accessible. This mode of operation can be used when the application works with the data from only one data area or the application uses data from all data areas for generation of consolidated reports.

According to the exemplary embodiment, the data separation is controlled using a conditional separation. The conditional separation is needed when the application is used with separated data and with regular data. For example, an application can be used in an autonomous mode. In this case the data separators are not used, but the separators exist and can be used for working with several clients if needed. The separation is turned off in the autonomous mode and is turned on in the multitenant mode.

The conditional separation is implemented as follows. A special control object is set for a separator (or for a sub-object of the separator). The control object stores a state of the separation for the given separator. The separation for all or for the selected objects can be turned on and off by changing the value of the control object. If the conditional separator is turned off, the default value for the type of the separator is used.

A property "value of data separation" is defined by a session parameter, which stores a value of the separator set for the current session. The type of the session parameter has to match the type of the separator. A property "usage of separated data" is defined by the control parameter as Boolean variable. If the control parameter is set as "true," the separator is used in the given session. A user can change the session parameter during the ongoing session if the user has a right to do so. The session parameter associated with at least one separator can be changed by a script. The script clears the object cache and deletes redundantly used values on the client side and on the server side.

According to the exemplary embodiment, the conditional separation can turn on and off the separation as follows. A "conditional separation" property for all the objects included in the separator is used. A "conditional separation" property is used only for selected objects. A "conditional separation" property is used for all the objects and for selected objects included the separator.

According to another exemplary embodiment, the conditional separation can be set in the properties of the common attribute by using a Boolean constant, which is not subjected to separation by the common attribute. For example, the configuration contains a directory Goods. A common attribute Company of a type integer is included into metadata. The common attribute Company is a subject to a conditional separation controlled by a constant SeparationByCompany. If the value of the constant SeparationByCompany is false, it means that the separator does not work (i.e., the separation is turned off) and vise versa.

If the separation is turned off, accessibility of the directory Goods will depend from a property "Usage of separated Goods." If this property is set as independent, none of the users (Companies) will not have access to records from Goods directory. If this property is set as commonly independent, all users will have access to all records from the Goods directory.

According to another exemplary embodiment, the conditional separation can be set using object requisite. In order to implement conditional separation of one separator, the data of another separator is used. Then, a different behavior of the separator for a different data area is possible. The conditional separation can be set for an object in its content property. The conditional separation can be set for each configuration object included into the separator. In this case, the separation is turned off only for the objects for which the conditional separation is configured.

The conditional separation can be implemented using a constant. For example, a developer has created an application for logging the clients and goods. The application contains two structures for storing data—Goods directory and Counteragents (counterparty) directory. The application is ready for use in a local desktop mode. However, the application needs to be used with a cloud-based Internet service. An on-line access to the application needs to be provided to at least two clients and each client is going to keep logs on behalf of at least two affiliated organizations.

An example of screen shot for solving this problem by creation of two common attributes Client and Organization is depicted in FIG. 1. A list of Clients and Organizations looks like the following:

Client A
Organization 1
  Organization 2
Client B
Organization 3
  Organization 4
    Organization 5

Data related to all of the organizations is stored in a database in two directories Counteragents and Goods. However, the user of an organization should be able to see and to access to the records related to this organization. The Client A wants for affiliated Organization 1 and Organization 2 to have access to the entire list of Goods. Thus, the Organizations 3, 4 and 5 need complete isolation of their data areas, while the Organizations 1 and 2 as well as other organizations registered at a later time and also controlled by the Client A need to have a common access to a directory Goods and need to be able to see all the records related to Goods of the Client A. Meanwhile, the data areas of Counteragent directory remains strictly separated by organizations, regardless of their affiliation with Clients.

Figure 2:
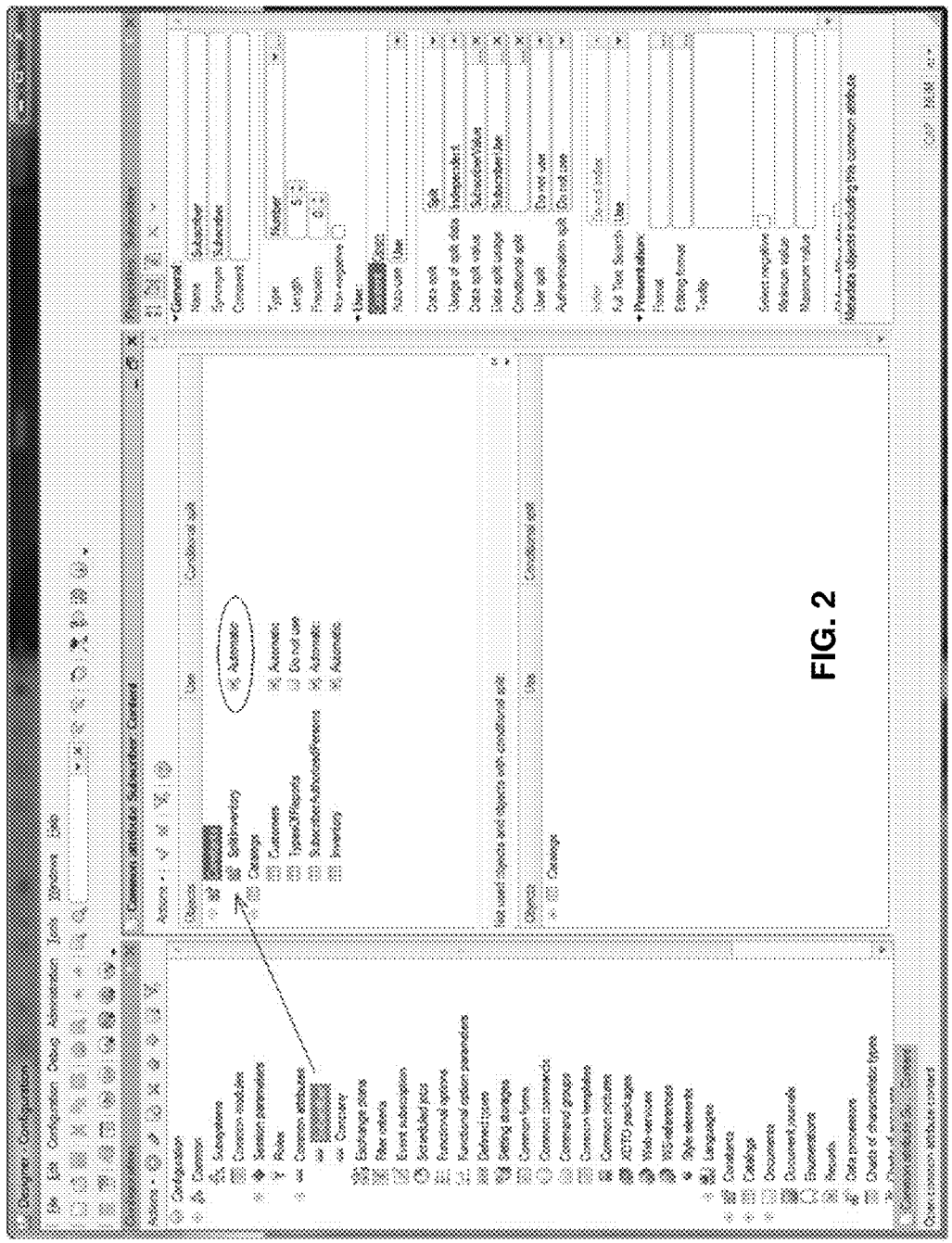
FIG. 2 illustrates a screen shot depicting SeparateGoods separated by Client (counterparty)
Figure 3:
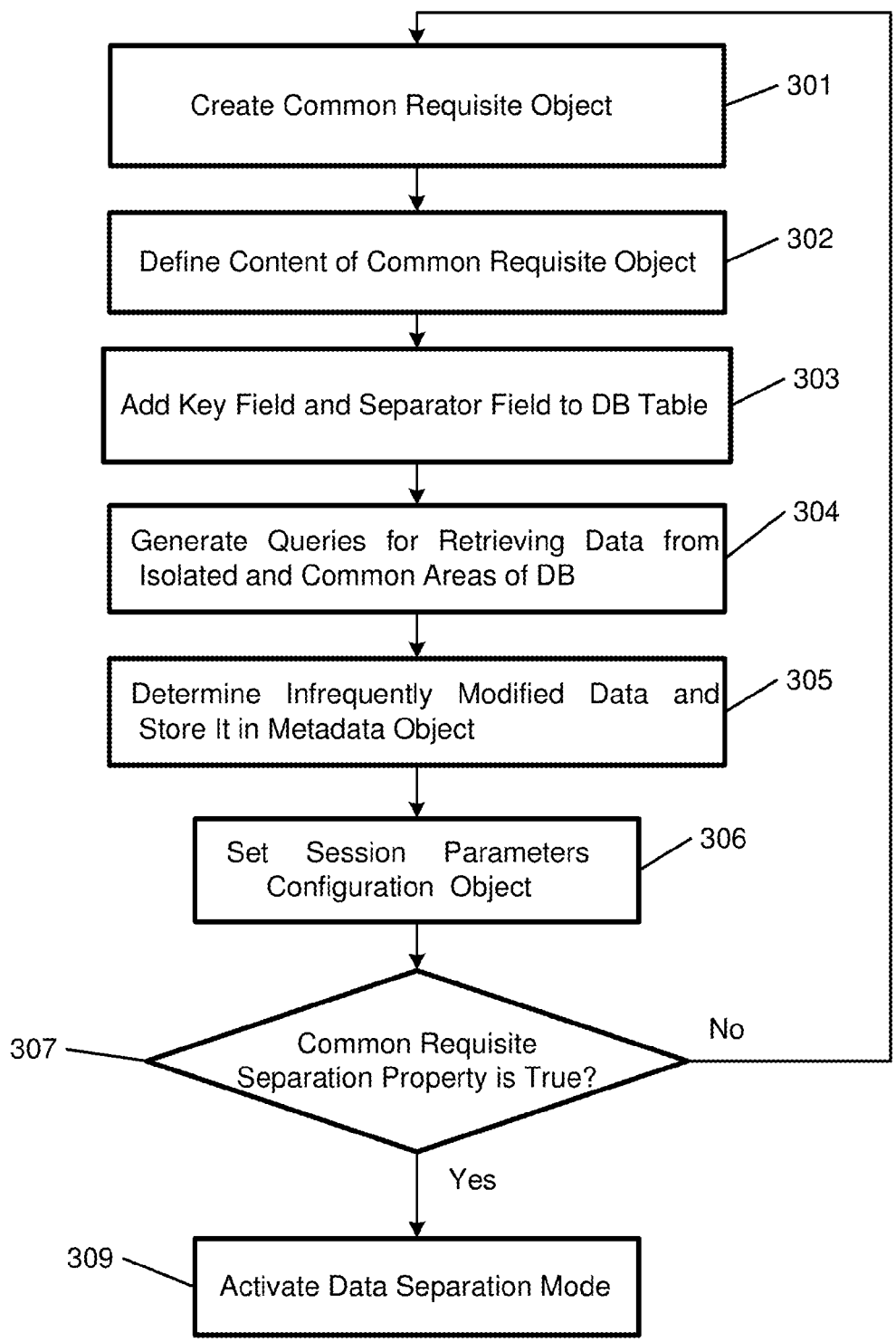
FIG. 3 illustrates a flow chart of a method, in accordance with the exemplary embodiment.

A screen shot (FIG. 1) illustrates that the separator includes directories that use separation in two directories Counteragents and Goods. The Goods directory has conditional separation configured depending on a current value of a constant SeparateGoods (true or false). The constant SeparateGoods is separated by the Clients, i.e., it has a different value for each of the clients (see FIG. 2). In order to achieve a desired effect for the Client A the constant is set as true, while for the Client B it is set as false. FIG. 3 shows a flow chart of a method of one embodiment of the invention.

In step 301, a common attribute object is created. The system defines a content of the common attribute object in step 302. In step 303, a key field and a separator field are added to a database table. The system generates queries for retrieving data from isolated and common areas of the database in step 304. In step 305, the system defines infrequently modified data and stores it in a metadata object. In step 306, the system sets session parameters configuration objects for limiting data access at records level. If, in step 307, the common attribute object has a data separation property set as a true (i.e., "separate") a data separation mode is activated in step 309. Otherwise, the process returns to step 301.

Figure 4:
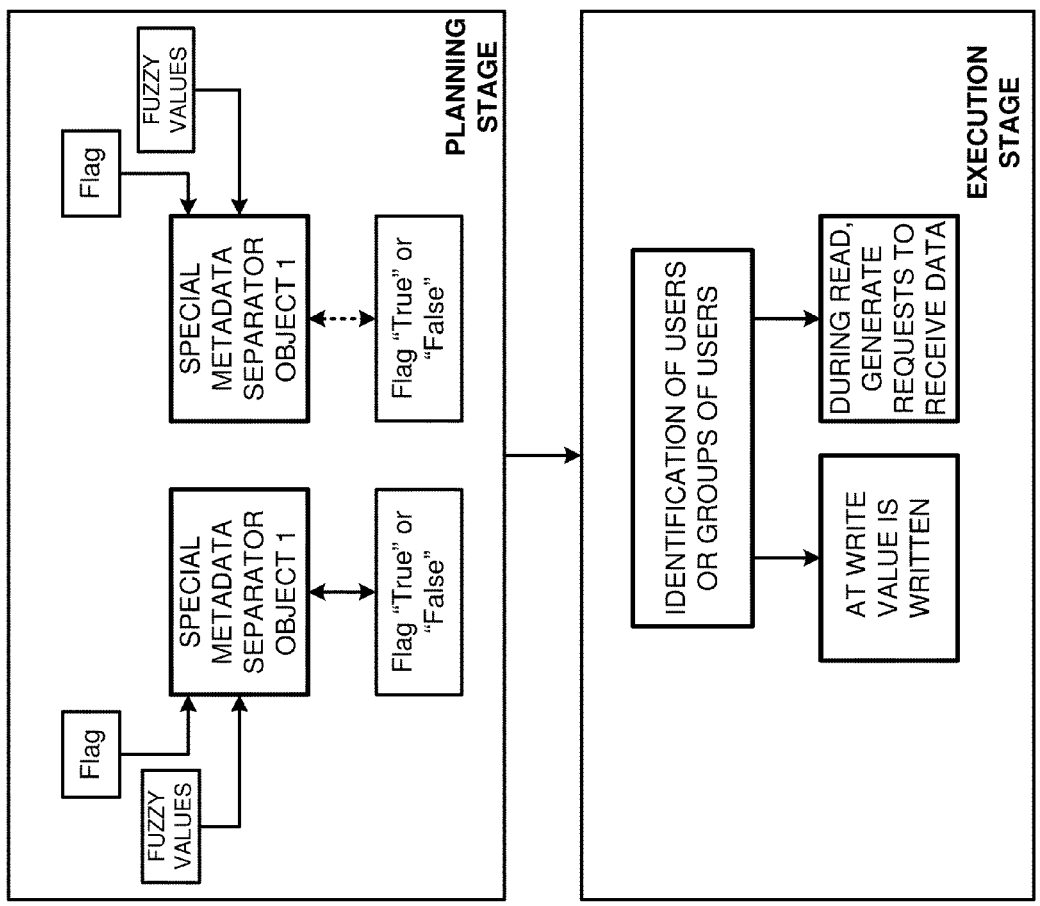
FIG. 4 illustrates how data separation is implemented at planning and execution stage, in accordance with the exemplary embodiment.

FIG. 4 illustrates how data separation is implemented at planning and execution stage, in accordance with the exemplary embodiment. At least two common requisite metadata objects serving as dividers (i.e., separators) are created. Each of the dividers has a link to at least one information object subject to division and to at least one source of divider values for each of the dividers. Each of the dividers has a link to constants having flags "true" and "false" for conditional data separation and the link is included into another divider and is dividable itself.

A session parameter metadata object is created for storing user identifiers and current values of the dividers. A user and/or user group is defined and the current values of each metadata object of each of the dividers are determined when database access session begins. An isolated data area for each user containing metadata objects with the common requisite is allocated. A user data area is determined based on the value of the common requisite and based on a conditional separator flag. A value of the common requisite is written into a corresponding data column upon writing into database objects being divided and referenced by the common requisite. Requests for data retrieval from data areas allocated to the user or a user group are generated during read operation.

Figure 5:
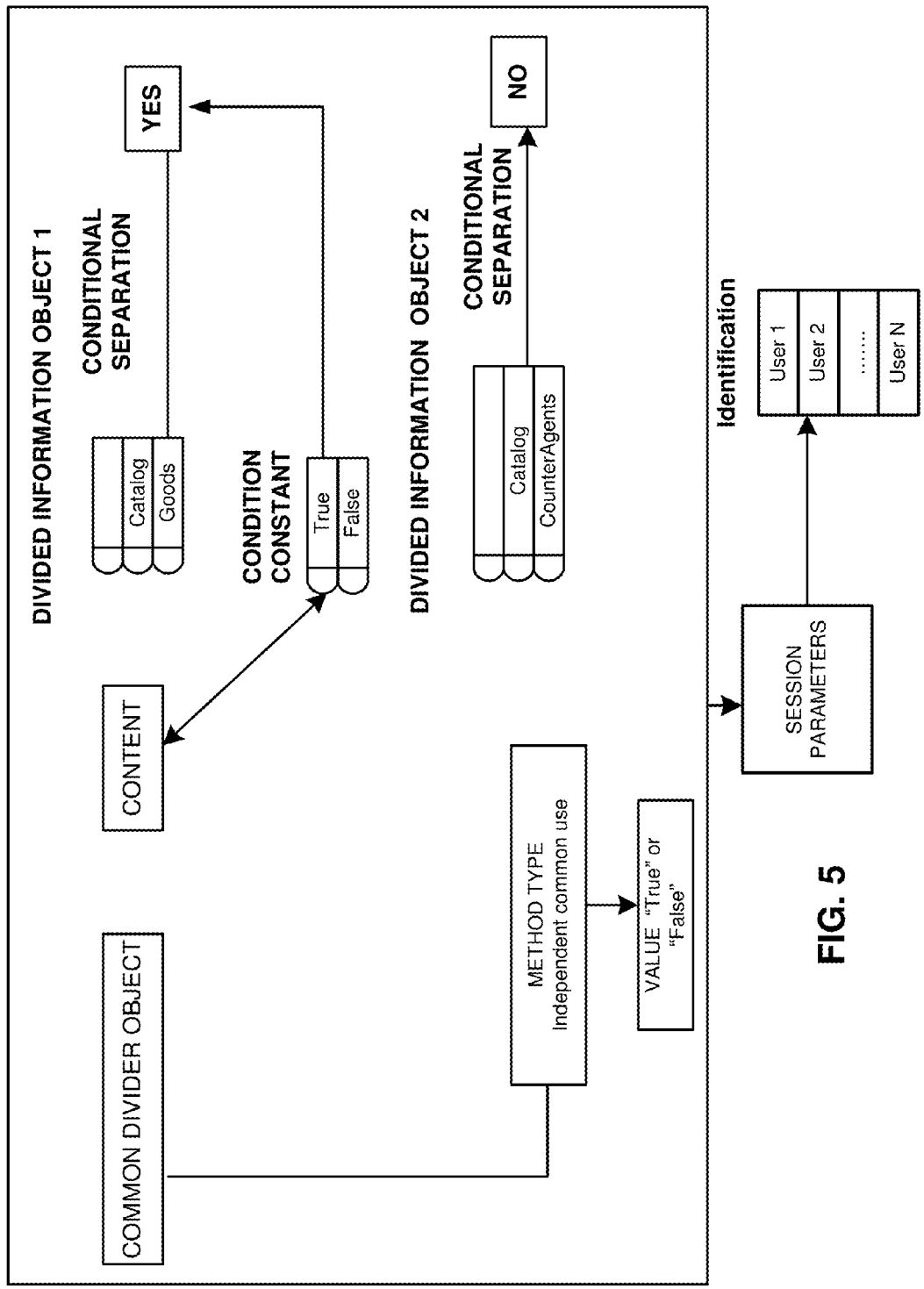
FIG. 5 illustrates a use of a common divider object, in accordance with the exemplary embodiment.

FIG. 5 illustrates a use of a common divider object, in accordance with the exemplary embodiment. Data related to all of the organizations is stored in a database in two directories Counteragents and Goods. However, the user of an organization should be able to see and to access to the records related to this organization. The Client A wants for affiliated Organization 1 and Organization 2 to have access to the entire list of Goods. Thus, the Organizations 3, 4 and 5 need complete isolation of their data areas, while the Organizations 1 and 2 as well as other organizations registered at a later time and also controlled by the Client A need to have a common access to a directory Goods and need to be able to see all the records related to Goods of the Client A. Meanwhile, the data areas of Counteragent directory remains strictly separated by organizations, regardless of their affiliation with Clients.

A common attribute object is created. The common attribute object includes a separator object and a metadata object. A condition for using the separator object is defined. A session parameters configuration objects is set for limiting data access at records level based on user identification. Then, if the common attribute object has a data separation property set as "true," a data separation mode is activated.

Figure 6:
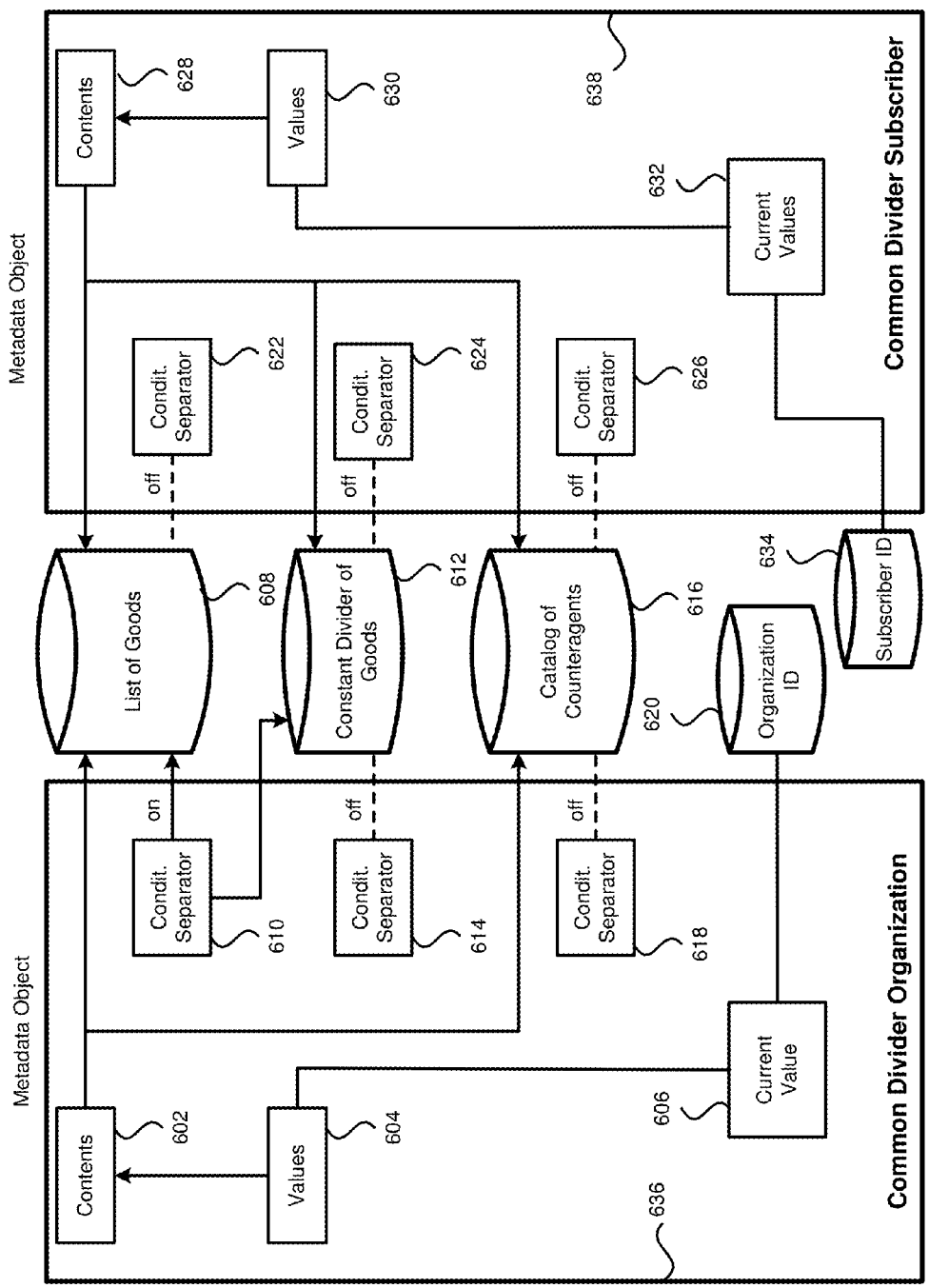
FIG. 6 illustrates application of two common separator requisite—i.e., divider objects, in accordance with the exemplary embodiment.

FIG. 6 illustrates application of two common separator requisite—i.e., divider objects. One common divider object is organization 636 and another common divider object is subscriber 638. Contents 602 and 628 reflect a set of data tables corresponding to each of the common dividers and residing in databases 608, 612 and 616. Values 604 and 630 are the common divider requisite values assigned to a particular user. Current values 606 and 632 are the values corresponding to the current user. These values are acquired from Organization ID database 620 and from subscriber ID database 634 respectively.

A table 608 containing a list of goods has two common requisites and the records are divided by subscribers and by organizations. According to the exemplary embodiment, a conditional separation can be implemented using conditional separators 610, 622, 614, 624, 618 and 626, corresponding to the databases 608, 612 and 616. If the conditional separation is "on," the data can be divided either by subscribers within the organization or by organization for all the subscribers depending on which of the conditional separators is turned on. A database 612 stores the constants for conditional separation. The constant is divided by subscriber but not by organization. Thus, the constant is included into the contents 628 of the subscriber 638.

Database 616 is a counteragent catalog (i.e., a table) divided by two dividers. For example, this table can store vendors, customers, contractors, etc. Note that the conditional separators are turned on and off by a flag bit. The objects 636 and 638 contain metadata sub objects. Meanwhile, these objects access real data tables 608, 612 and 616—i.e., data objects subject to being divided using data from the organization table 620 and the subscriber table 634. Thus, the subscribers can be divided by the organization and share data. Organizations can be used as subsidiaries. On and off position of the conditional dividers can be dictated by the desired type of data separation.

Figure 7:
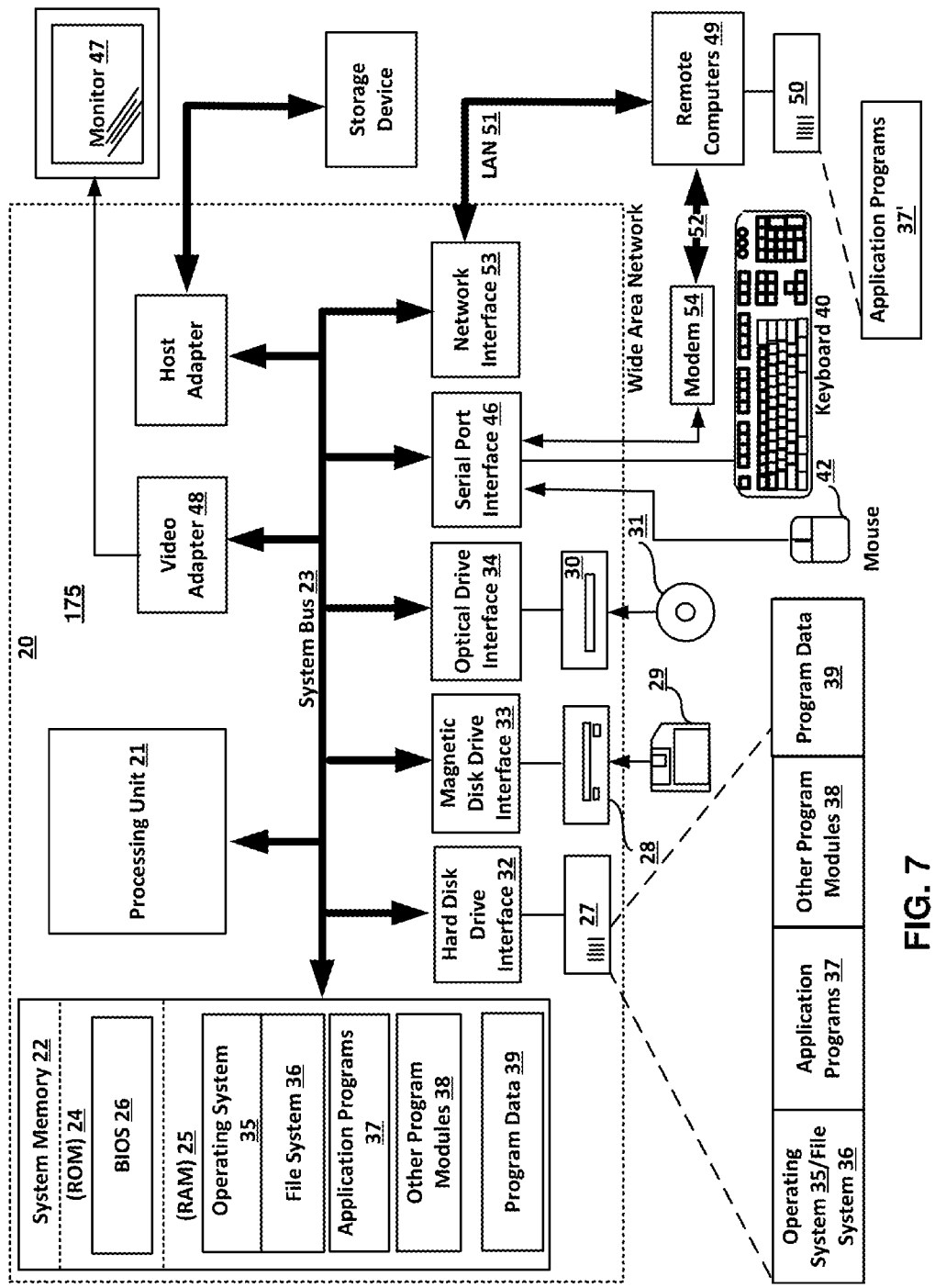
FIG. 7 illustrates a schematic of an exemplary computer system that can be used for implementation of the invention.

With reference to FIG. 7, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective deletion of files without possibility of restoration.

It should also be appreciated that various modifications, adaptations and alternative embodiments thereof may be made within the scope and spirit of the present invention. The invention is further defined by the following claims.

What is claimed is:

1. A computer-implemented method for separation of data stored in a database, the method comprising:

creating at least one separator metadata object that contains a link to at least one data object stored in the database and to a source of values of the separator metadata object, wherein the values are provided from a session parameters object, the session parameters object containing user identification;

upon a session start, identifying the users connected to the database, and specifying user data access based on the session parameters object and based on access permission data;

defining values of the separator metadata object; and creating a second separator metadata object that includes a link to a partitioned object containing a flag corresponding to the data objects in the database, wherein, upon reading and writing to the database, the read and write requests to a user's private data in the database and a common area in the database are filtered using the flag and values in the separator metadata objects, wherein, when writing into partitioned objects in the database that are linked to by the separator metadata object, storing the value of the separator metadata object into a database column; and wherein when reading data from the partitioned objects, filtering read requests to the database using the values.

2. The method of claim 1, wherein the data object includes accounts' charts and invoice data.

3. The method of claim 1, wherein the database includes at least one data object accessible by multiple users, and wherein the database includes at least one special metadata object that contains a type of use of at least one data object.

4. The method of claim 3, wherein the type of use is "used separately" or "used together," and which is represented by value, such that a "false" value means that upon starting a database access session, the session parameters are defined and users are identified, and upon reading partitioned data objects, current session parameters are ignored and access to partitioned data object is granted based on filtering by the separator metadata object.

5. A computer-implemented method for automated control of separation of data stored in a database, the method comprising:
   creating at least one common requisite metadata object serving as a divider and having a link to at least one information object subject to division and to at least one source of divider values;
   setting parameters of the common requisite defining how the common requisite is used in at least one metadata object subject to division;
   defining a session parameter metadata object for storing user identifiers and current values of the divider;
   identifying user and user groups and determining current values of each metadata object of the divider when database access session begins;
   allocating an isolated data area for each user containing metadata objects with the common requisite;
   writing a value of the common requisite into a corresponding data column upon writing into database objects being divided and referenced by the common requisite; and
   generating requests for data retrieval from data areas allocated to the user or a user group.

6. The method of claim 5, wherein if common requisite parameter is set to auto, the common requisite is automatically added to all existing configuration objects and is added to newly created configuration objects.

7. The method of claim 5, wherein if common requisite parameter is off, the common requisite is not automatically added to all existing configuration objects and the common requisite is added only to the objects based on divider content.

8. The method of claim 5, further comprising providing links in each of the dividers to constants having "true" and "false" flags for conditional data separation, wherein the link is included into another divider and is dividable itself.

9. The method of claim 5, wherein the database has at least one common access object accessible by all users for read operations regardless of session parameters and a state of conditional separator flag.

10. The method of claim 5, wherein users and user groups are identified upon initiation of a database access session by setting current session parameters.

11. The method of claim 10, wherein if common requisite parameter is "true", the current session parameters are ignored when the user accesses database objects and the user is granted read access to an arbitrary set of records based on a set of divider values.

12. The method of claim 5, wherein a user data area is determined based on the value of the common requisite and based on conditional separator flags.

* * * * *